US012670385B2

(12) United States Patent
Borgohain et al.

(10) Patent No.: US 12,670,385 B2
(45) Date of Patent: Jun. 30, 2026

(54) TECHNIQUE FOR RETRAINING OPERATIONAL NEURAL NETWORKS USING SYNTHETICALLY GENERATED RETRAINING DATA

(71) Applicant: Siemens Healthineers AG, Forchheim (DE)

(72) Inventors: Indraneel Borgohain, East Windsor, NJ (US); Teodora Marina Chitiboi, Hamburg (DE); Puneet Sharma, Princeton Junction, NJ (US)

(73) Assignee: Siemens Healthineers AG, Forchheim (DE)

( * ) Notice: Subject to any disclaimer, the term of this patent is extended or adjusted under 35 U.S.C. 154(b) by 802 days.

(21) Appl. No.: 17/655,010

(22) Filed: Mar. 16, 2022

(65) Prior Publication Data
US 2022/0309342 A1 Sep. 29, 2022

(30) Foreign Application Priority Data
Mar. 29, 2021 (EP) ..................................... 21165543

(51) Int. Cl.
*G06N 3/08* (2023.01)
(52) U.S. Cl.
CPC ..................................... *G06N 3/08* (2013.01)
(58) Field of Classification Search
CPC .......... G06N 3/08; G06N 3/045; G06N 3/047; G06N 3/084; G16H 50/20
See application file for complete search history.

(56) References Cited

U.S. PATENT DOCUMENTS

| | | | |
|---|---|---|---|
| 10,839,269 B1 * | 11/2020 | Al-Turki | G06N 3/08 |
| 2019/0251398 A1 * | 8/2019 | Godwin, IV | G06F 18/217 |
| 2021/0027107 A1 * | 1/2021 | Pekelny | G06N 3/045 |
| 2021/0150310 A1 * | 5/2021 | Wu | G06T 11/60 |

FOREIGN PATENT DOCUMENTS

WO WO-2020244788 A1 * 12/2020 ............. A61N 5/103

OTHER PUBLICATIONS

Gao, Yuan, and Yiqiang Han. "Automated Testing for Deep Learning Systems with Differential Behavior Criteria." arXiv preprint arXiv:1912.13258 (2019). (Year: 2019).*

(Continued)

*Primary Examiner* — Matthew Ell
*Assistant Examiner* — Humaira Zahin Mauni

(57) ABSTRACT

A neural network system for retraining operational neural networks using a synthetic data set generated by a synthetic data generator neural network is provided. The synthetic data generator network comprises an input layer for receiving an input data set; an output layer for outputting the synthetic data set; and a loss function for receiving from each operational network a value of a medical metric. The operational networks each comprise an input layer for receiving the synthetic data set; and an output layer for outputting the value of the medical metric. The synthetic data generator network is trained for generating the synthetic data set based on the loss function comprising a difference of the values of the medical metric. Each operational network is retrained using the synthetic data set.

17 Claims, 7 Drawing Sheets

(56)         References Cited

OTHER PUBLICATIONS

Pei, Kexin, et al. "Deepxplore: Automated whitebox testing of deep learning systems." proceedings of the 26th Symposium on Operating Systems Principles. 2017.

Rieke, Nicola, et al. "The future of digital health with federated learning." NPJ digital medicine 3.1 (2020): 1-7.

Zhang Qiuchen et al: "Towards Training Robust Private Aggregation of Teacher Ensembles Under Noisy Labels", 2020 IEEE International Conference on Big Data (Big Data), IEEE, Dec. 10, 2020 (Dec. 10, 2020), pp. 1103-1110.

Rezaei Mina et al: "Generative 1-19 Adversarial Framework for Learning Multiple Clinical Tasks", 2018 Digital Mage Computing: Techniques and Applications (DICTA), IEEE, Dec. 10, 2018 (Dec. 10, 2018), pp. 1-8.

Min Shaobo et al: "A Mutually Attentive Co-Training Framework for Semi-Supervised Recognition", IEEE Transactions on Multimedia, IEEE Service Center, US, vol. 23, Apr. 23, 2020 (Apr. 23, 2020), pp. 899-910.

Chen Chen et al: "Deep learning for 1-19 cardiac image segmentation: A review", arxiv.org, Cornell University Library, 201 Olin Library Cornell University Ithaca, NY 14853, Nov. 9, 2019 (Nov. 9, 2019.

Extended European Search Report (EESR) mailed Nov. 4, 2021 in corresponding European Patent Application No. 21165543.6.

* cited by examiner

FIG 2

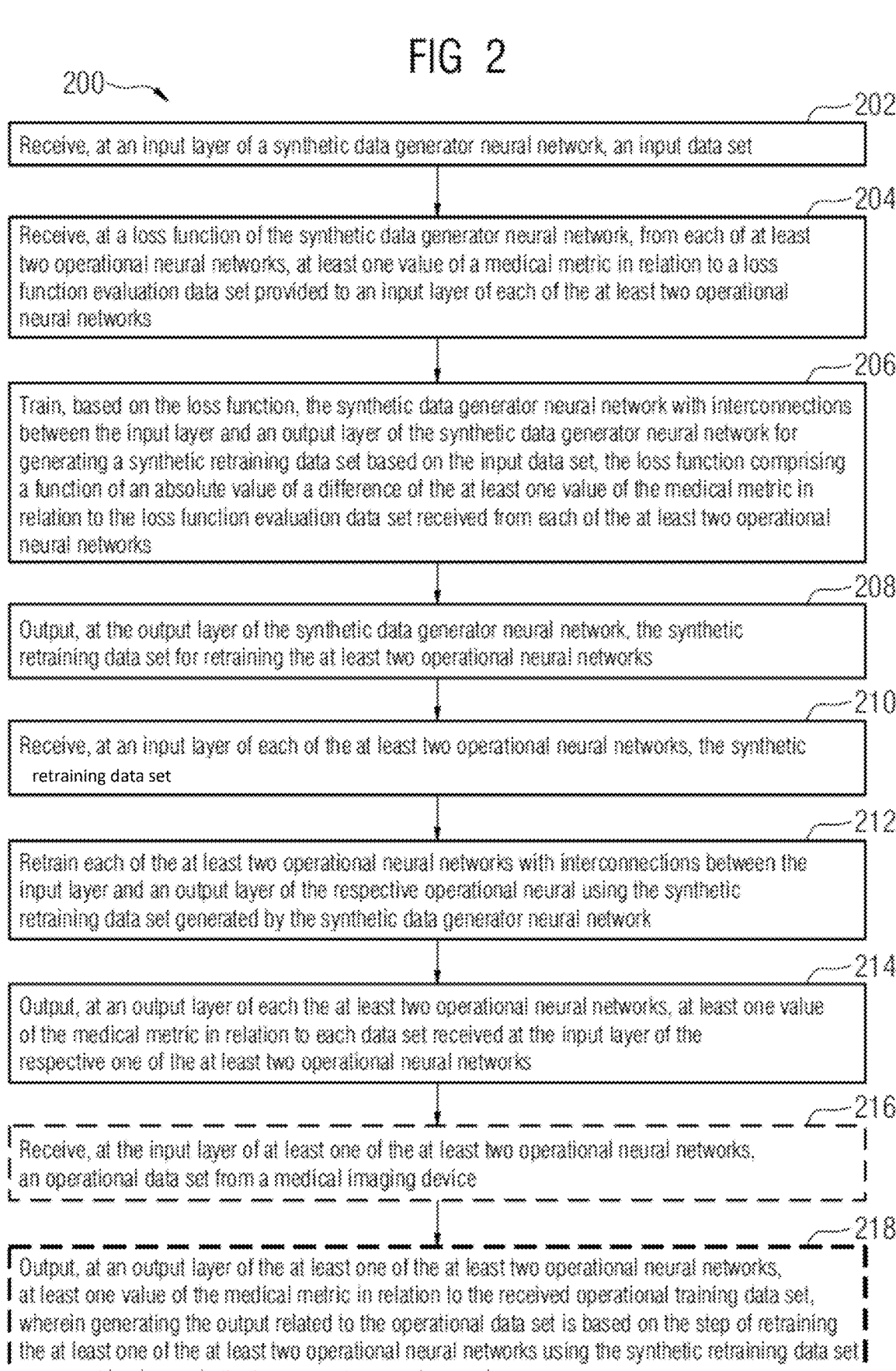

200

202
Receive, at an input layer of a synthetic data generator neural network, an input data set 204
Receive, at a loss function of the synthetic data generator neural network, from each of at least two operational neural networks, at least one value of a medical metric in relation to a loss function evaluation data set provided to an input layer of each of the at least two operational neural networks 206
Train, based on the loss function, the synthetic data generator neural network with interconnections between the input layer and an output layer of the synthetic data generator neural network for generating a synthetic retraining data set based on the input data set, the loss function comprising a function of an absolute value of a difference of the at least one value of the medical metric in relation to the loss function evaluation data set received from each of the at least two operational neural networks 208
Output, at the output layer of the synthetic data generator neural network, the synthetic retraining data set for retraining the at least two operational neural networks 210
Receive, at an input layer of each of the at least two operational neural networks, the synthetic retraining data set 212
Retrain each of the at least two operational neural networks with interconnections between the input layer and an output layer of the respective operational neural using the synthetic retraining data set generated by the synthetic data generator neural network 214
Output, at an output layer of each the at least two operational neural networks, at least one value of the medical metric in relation to each data set received at the input layer of the respective one of the at least two operational neural networks 216
Receive, at the input layer of at least one of the at least two operational neural networks, an operational data set from a medical imaging device 218
Output, at an output layer of the at least one of the at least two operational neural networks, at least one value of the medical metric in relation to the received operational training data set, wherein generating the output related to the operational data set is based on the step of retraining the at least one of the at least two operational neural networks using the synthetic retraining data set generated by the synthetic data generator neural network

TECHNIQUE FOR RETRAINING OPERATIONAL NEURAL NETWORKS USING SYNTHETICALLY GENERATED RETRAINING DATA

RELATED APPLICATION

This application claims the benefit of Ser. No. 21/165,543, filed Mar. 29, 2021, which is hereby incorporated by reference in its entirety

FIELD

The present disclosure relates to a technique for cooperatively retraining operational neural networks without sharing their operational data sets.

TECHNICAL BACKGROUND

An operational neural network connected to a medical imaging device at a clinical site is conventionally trained for image recognition and outputting of a medical metric independently of any further operational neural network located at a different clinical site. The independence of the conventional training of operational neural networks across multiple clinical sites is due to data security and privacy constraints, which prevent operational data sets acquired by one medical imaging device to be shared with an operational neural network located at a different clinical site.

A challenge of such a conventional independent training of each operational neural network is the availability of training data sets, which is generally restricted by a lack of diversity in locally acquired data sets at the medical imaging device connected to the operational neural network. The lack of diversity in the training data sets can result in inconsistent or inaccurate outputs of the medical metric for operational data sets that have features occurring rarely or less frequently than others, e.g., in relation to a pathological or abnormal medical condition versus a healthy medical condition.

Moreover, the conventional independent training of each operational neural network requires to amass large amounts of potentially relevant data to central servers or data centers. In the context of medical images at a clinical site, that means collecting users' (in particular sensitive) data, which are conventionally not be shared with another medical or technical site.

Conventionally, an operational neural network at one clinical site may exchange parameters, in particular weights of neurons, with another operational neural network with the same network architecture at another clinical site for improving the robustness of the operational neural network.

By the exchange of network architecture related parameters, however, the problem of the scarcity of training data with rare and abnormal features and hence a lack of consistency or accuracy for these rare and abnormal features remains. Moreover, by pairwise sharing parameters among two operational neural networks, any required retraining phase and training resources rapidly (e.g., exponentially) increase with the number of operational neural networks.

SUMMARY

Accordingly, there is a need for a technique for cooperatively retraining operational neural networks without sharing (e.g., operational) data and/or parameters among the operational neural networks.

As to a first aspect, a neural network system for retraining at least two operational neural networks by a synthetic retraining data set generated by a synthetic data generator neural network is provided. The synthetic retraining data set, when used as input to each of the at least two operational neural networks prior to retraining, produces at least one inconsistent output value of a medical metric and after retraining produces instead of the at least one inconsistent output value a consistent output value. The neural network system includes the synthetic data generator neural network and the at least two operational neural networks.

The synthetic data generator neural network includes an input layer configured to receive an input data set. The synthetic data generator neural network further includes an output layer configured to output, based on the input data set, the synthetic retraining data set for retraining the at least two operational neural networks. The synthetic data generator neural network further includes a loss function configured to receive at least one value of the medical metric from each of the at least two operational neural networks in relation to a loss function evaluation data set.

Each of the at least two operational neural networks includes an input layer configured to selectively receive the synthetic retraining data set, the loss function evaluation data set and/or an operational data set. Each of the at least two operational neural networks further includes an output layer configured to output at least one value of the medical metric in relation to each data set received at the input layer.

The synthetic data generator neural network with interconnections between the input layer and the output layer of the synthetic data generator neural network is trained for generating the synthetic retraining data set based on the loss function including a function of an absolute value of a difference of the at least one value of the medical metric received from each of the at least two operational neural networks.

Each of the at least two operational neural networks with interconnections between the input layer and the output layer of the respective operational neural network is retrained by using the synthetic retraining data set generated by the synthetic data generator neural network.

Each neural network may briefly be denoted as network.

Any one of the at least two operational neural networks may include an existent neural network and/or a previously deployed neural network, e.g., at a clinical site. At least one or each of the operational neural networks may have been locally trained (e.g., previously trained locally) by a plurality of (e.g., synthetic and/or operational, also denoted as "real") training data sets.

The output of the at least one value of the medical metric by an operational neural network may also briefly be referred to as the output of the operational neural network.

The at least one inconsistent output value of the medical metric may include the at least two operational neural networks outputting different values of the medical metric based on the same data set received at the input layer of each of the at least two operational neural networks. The data set received may include the loss function evaluation data set (e.g., during training of the synthetic data generator neural network), the synthetic retraining data set (e.g., during retraining of the operational neural networks), and/or any operational data set (e.g., during operating of the operational neural networks).

Alternatively, or in addition, the at least one consistent output value of the medical metric may include outputting the same value of the medical metric based on the same data set received at the input layer of each of the at least two operational neural networks. The data set received may include the loss function evaluation data set (e.g., during training of the synthetic data generator neural network), the synthetic retraining data set (e.g., during retraining of the operational neural networks), and/or any operational data set (e.g., during operating of the operational neural networks).

The retraining of an operational neural network may also be denoted as finetuning the operational neural network. The retraining and/or finetuning of the operational neural network may include (e.g., small) adjustments to parameters of the operational neural network. By the retraining and/or finetuning of the operational neural network, a performance of the operational neural network may be improved.

The loss function evaluation data set and the synthetic retraining data set may include the same type and/or may be of the same type as any (e.g., operational) data set, which may be received at the input layer of any one of the operational neural networks, e.g., from a medical imaging device.

For example, the loss function evaluation data set may include one or more synthetic images (e.g., a sequence of images, in particular a temporal magnetic resonance image, MRI, sequence, which may also be denoted as cine MRI). The synthetic retraining data set may include one or more synthetic images of the same type as those included in the loss function evaluation data set. The synthetic retraining data set may in particular include the same one or more synthetic images as the loss function evaluation data set. Alternatively, or in addition, the synthetic retraining data set may additionally include annotations in relation to the one or more synthetic images. By the annotations, the at least two operational neural networks may be trained for outputting at least one consistent value of the medical metric.

Selectively receiving the loss function evaluation data set, the synthetic retraining data set, and/or an operational data set at the input layer of the operational data set may include receiving one of the data sets depending on a deployment stage of the neural network system. E.g., in a first stage, the synthetic data generator neural network may be trained based on the loss function. Each of the at least two operational neural networks may receive the loss function evaluation data set at the input layer in the first stage and output at least one value of the medical metric in relation to the loss function evaluation data set, which is received at the loss function of the synthetic data generator neural network. Alternatively, or in addition, in a second stage, each of the at least two operational neural networks may be retrained. For retraining, the synthetic retraining data set may be received at the input layer of each of the at least two operational neural networks. Further alternatively, or in addition, a third stage may include any one of the at least two operational neural networks, after being retrained, receiving one or more operational data sets, e.g., from a medical imaging device, at the input layer and outputting at least one value of the medical metric for the received one or more operational data sets.

Each of the operational neural networks may be connected to a medical imaging device (also denoted as "medical scanner" or briefly "scanner"), e.g., a magnetic resonance imaging (MRI) scanner. The medical (e.g., MRI) scanner and/or the respective operational neural network may be located at a clinical site. The at least two operational neural networks may be located at different clinical sites. Alternatively, or in addition, two or more of the at least two operational neural networks may be located at the same clinical site.

The operational data set may include a (e.g., real) data set acquired by the medical scanner, e.g., an image or a sequence of images acquired by an MRI scanner. A temporal sequence of images may also be denoted as cine images.

A synthetic retraining data set may include a data set of the same type as received from the medical scanner, e.g., a synthetic image or a sequence of synthetic images simulating and/or resembling an MRI image or an MRI sequence of images, respectively.

Generating the synthetic retraining data set based on a difference of the at least one value of the medical metric may include an absolute value of a difference of, a sum of squared differences of, and/or a sum over quadratic functions of a plurality of values of the medical metric. E.g., the synthetic retraining data set may include one or more synthetic images simulating and/or resembling (e.g., cardiac) MRI images, and to each spatial location (e.g., each pixel and/or each segment of a segmentation, in particular a delineation of the left ventricular cavity, myocardium and right ventricle from cardiac MRI images, for example using a segmentation according to the American Heart Association (AHA) model) of the one or more synthetic images, at least one value of the medical metric may be associated. For example, the at least one value of the medical metric may include a cardiac chamber volume, a value indicative of a function of a cardiac chamber, a myocardial elasticity and/or a local heart chamber wall thickness value indicative of a presence of myocardial scar tissue at the pixel and/or the segment of the segmentation.

Receiving at least one value of the medical metric from each of the at least two operational neural networks in relation to the loss function evaluation data set and/or the synthetic retraining data set at the loss function of the synthetic data generator neural network may also be denoted as receiving feedback from each operational neural network.

By receiving different feedbacks from different operational neural networks, the training of the synthetic data generator neural network may be optimized to generate synthetic retraining data sets at and/or close to a decision boundary that separates regions in a multi-dimensional feature space of a machine learning network and/or of any one of the operational neural networks (e.g., as to the value of the medical metric such as a decision on the presence of myocardial scar tissue). Alternatively, or in addition, by retraining any one of the at least two operational neural networks using the synthetic retraining data set, an algorithm accuracy at and/or around a classifier boundary, e.g., as to at least one consistent and/or accurate value of the medical metric, may be improved.

The function of the absolute value of the difference of the at least one value of the medical metric in relation to the loss function evaluation data set received from each of the at least two operational neural networks may include the negative of the square of the difference of the at least one value of the medical metric.

The input layer of each of the at least two operational neural networks may be further configured to receive an operational data set from a medical imaging device. The output layer of each of the at least two operational neural networks may be further configured to output at least one value of the medical metric in relation to the received operational data set. Generating the output related to the operational data set may be based on the interconnections retrained by the synthetic retraining data set generated by the synthetic data generator neural network.

The medical imaging device may include a magnetic resonance imaging (MRI) device (also denoted as MRI scanner). Alternatively, or in addition, the medical imaging device may include a computed tomography (CT) device (also denoted as CT scanner). Further alternatively, or in addition, the medical imaging device may include an ultrasound imaging device.

The input data set of the synthetic data generator neural network and the synthetic retraining data set may be of the same type. Optionally, the synthetic retraining data set may include a medical image data set, and the input data set of the synthetic data generator neural network may include a synthetic medical image set and/or a medical image set acquired (e.g., previously) by a medical imaging device.

The input data set received at the input layer of the synthetic data generator neural network may include the synthetic retraining data set.

The synthetic data generator neural network may sequentially generate a plurality of synthetic retraining data sets. Optionally, generating the plurality of synthetic retraining data sets may include recursively generating a further synthetic retraining data set based on the synthetic retraining data set.

The input seed may include a random and/or diverse selection of (e.g., freely available) real data sets and/or synthetic data sets of the same type as the operational data sets, the input of which the at least two operational neural networks are trained for. For example, the input seed may include a cardiac MRI image obtained with a balanced steady state free precession sequence, with a late gadolinium enhancement (LGE) image sequence and/or with any other MRI sequence that depicts myocardial tissue properties, e.g., in view of the presence of scar tissue. The input set may in particular include any one of cardiac MRI images of the data set of the Kaggle Second Annual Data Science Bowl, which took place from 29 Feb. 2016 to 14 Mar. 2016, and wherein the data set includes hundreds of cardiac MRI images in DICOM format with 2D cine images containing approximately 30 images across the cardiac cycle.

The synthetic data generator neural network may be trained to generate a retraining data set that maximizes a neuron coverage. The neuron coverage may relate to neurons of the input layer, the output layer and/or any hidden layer between the input layer and the output layer of any one of the synthetic data generator neural network and the at least two operational neural networks.

Further alternatively, or in addition, the synthetic data generator neural network may be trained to generate a retraining data set which maximizes a number and/or numbering of interconnections. The number of interconnections may refer to interconnections of neurons of neighboring layers, e.g., an interconnection of a neuron of the input layer with any neuron of a first hidden layer of the synthetic data generator neural network and/or any one of the at least two operational neural networks.

The synthetic data generator neural network may include an auto-encoder-decoder neural network (also briefly denoted as "auto-encoder").

By the encoder of the auto-encoder-decoder neural network, data (e.g., data sets) received at the input layer may be converted into latent features. By the decoder of the auto-encoder-decoder neural network, latent features may be converted into retraining data sets.

Each of the at least two operational neural networks may include a convolutional neural network (CNN).

The medical metric may include a cardiac metric.

The cardiac metric may include at least one of a segmentation, a delineation, and/or spatial position of a region of at least one of a cardiac chamber and myocardium; a scar burden of the myocardium; a myocardial elasticity; a motion pattern; a linear size of a heart chamber, optionally a thickness of a heart wall; a volumetric size of a heart chamber; a mass of a heart chamber; an ejection fraction (EF) of a cardiac chamber; and a hemodynamic index.

The operational data set received at any one of the at least two operational neural networks may include LGE images acquired by cardiac MRI. A motion pattern, an enhancement in intensity of the myocardial image pixels and/or a local thickness of a heart wall may be indicative of myocardial scar tissue (e.g., locally in relation to pixels of the LGE images and/or a segmentation of the LGE images).

The loss function of the synthetic data generator neural network may further include a neuron coverage loss. The neuron coverage loss may include an inducement (also denoted as bias and/or stimulus) for training the synthetic data generator neural network to increase a number of neurons covered in the operational neural networks when receiving the synthetic retraining data set.

Alternatively, or in addition, the loss function of the synthetic data generator neural network may further include a reconstruction loss. The reconstruction loss may include an inducement (also denoted as bias and/or stimulus) for training the synthetic data generator neural network to reduce a difference between the input data set of the synthetic data generator neural network and the generated synthetic retraining data set.

Optionally, optimizing the loss function may include maximizing and/or minimizing the loss function.

The neuron coverage loss may include a count of a number of neurons with an activation and/or an output above a predefined threshold, e.g., $f_n(x) = \Sigma_i n_i(x)$, wherein $n_i(x)$ is the activation and/or output of the i-th neuron as a function of the input image x, e.g., at one or all of the at least two operational neural networks.

The reconstruction loss may include an absolute value and/or a square of a difference between the input and output of the synthetic data generator neural network (e.g., the auto-encoder-decoder neural network). Alternatively, or in addition, the reconstruction loss may include a sum of absolute values and/or of squares of differences between the input and output of the synthetic data generator neural network (e.g., including an auto-encoder-decoder neural network).

Generating the synthetic retraining data set by the synthetic data generator neural network (e.g., an auto-encoder-decoder neural network) may include optimizing a (e.g., total loss) function which may be a (e.g., weighted) sum of multiple terms. The terms may include the difference of the at least one value of the medical metric in relation to the loss function evaluation data set and/or the respective retraining data set received from at least two or each of the at least two operational neural networks, the neuron coverage loss and/or the reconstruction loss.

The loss function may include a, preferably weighted, sum of the negative of the square of the difference of the at least one value of the medical metric in relation to the loss function evaluation data set and/or the synthetic retraining data set received from each of the at least two operational neural networks; the negative of the neuron coverage loss; and the reconstruction loss, wherein the reconstruction loss includes an absolute value of a difference between the input data set and the synthetic retraining data set generated based on the input data set.

Optionally, optimizing the loss function may include minimizing the loss function. Further optionally, each term of the sum may be weighted by a weight in the range between 0 and 1. Still further optionally, the sum over the weights may be equal to 1.

Generating the synthetic retraining data set may include adding a manual annotation as to the at least one value of the medical metric.

For example, if the feedback from two or any number of the at least two operational neural networks includes a (e.g., significant) difference in the at least one value of the medical metric, the corresponding retraining data set may be manually annotated by a clinical expert. The manual annotations may be included in the up-dated retraining data set for retraining of any one of the at least two operational neural networks.

Each of the at least two operational neural networks may include a plurality of hidden layers between the input layer and the output layer of the respective operational neural network.

The at least two operational neural networks may include an identical layer architecture. The layer architecture may include a number of neurons at the input layer and a number of neurons at the output layer. Optionally, the layer architecture may further include a number of hidden layers and a number of neurons at each hidden layer.

The at least two or all operational neural networks may be collocated at one site. Alternatively, or in addition, at least two or all of the at least two operational neural networks may be located at different sites (e.g., if the number of operational neural networks is at least three, a subset, e.g., two, of the set of operational neural networks may be collocated, and a complement, e.g., another one in the case of a total number of three operational neural networks, of the subset within the set of operational neural networks may be located at one or more different sites).

As to a second aspect, a method of retraining, using a neural network system, at least two operational neural networks by a synthetic retraining data set generated by a synthetic data generator neural network is provided. The synthetic retraining data set, when used as input to each of the at least two operational neural networks prior to retraining produces at least one inconsistent output value of a medical metric and after retraining produces instead of the at least one inconsistent output value a consistent output value. The method includes or initiates an act of receiving, at an input layer of the synthetic data generator neural network an input data set. The method further includes or initiates an act of receiving, at a loss function of the synthetic data generator neural network from each of the at least two operational neural networks, at least one value of the medical metric in relation to a loss function evaluation data set provided to an input layer of each of the at least two operational neural networks. The method further includes or initiates an act of training, based on the loss function, the synthetic data generator neural network with interconnections between the input layer and an output layer of the synthetic data generator neural network for generating the synthetic retraining data set based on the input data set. The loss function includes a function of an absolute value of a difference of the at least one value of the medical metric in relation to the loss function evaluation data set received from each of the at least two operational neural networks. The method further includes or initiates an act of outputting, at the output layer of the synthetic data generator neural network, the synthetic retraining data set for retraining the at least two operational neural networks.

The method still further includes or initiates an act of receiving, at the input layer of each of the at least two operational neural networks, the synthetic retraining data set. The method still further includes or initiates an act of retraining each of the at least two operational neural networks with interconnections between the input layer and an output layer of the respective operational neural network using the synthetic retraining data set generated by the synthetic data generator neural network.

The method still further includes or initiates an act of outputting, at the output layer of each of the at least two operational neural networks, at least one value of the medical metric in relation to each data set received at the input layer of the respective one of the at least two operational neural networks.

The act of receiving, at the loss function of the synthetic data generator neural network, at least one value of a medical metric in relation to the loss function evaluation data set from each of the at least two operational neural networks may be based on an act of outputting, at the output layer of the synthetic data generator neural network, the loss function evaluation data set, which is received at each of the at least two operational neural networks. Alternatively, or in addition, the output of the loss function evaluation data set may depend on the input data set received at the input layer of the synthetic data generator neural network.

The method may further include or initiate an act of receiving, at the input layer of at least one of the at least two operational neural networks, an operational data set from a medical imaging device. The method may further include or initiate an act of outputting, at the output layer of the at least one of the at least two operational neural networks, at least one value of the medical metric in relation to the received operational data set. Generating the output related to the operational data set may be based on the act of retraining, using the synthetic retraining data set generated by the synthetic data generator neural network, the at least one of the at least two operational neural networks.

The method may further include one or more acts using the neural network system according to or corresponding to any feature disclosed in the context of the first and/or the neural network system aspect.

As to a third aspect, a computer program product is provided. The computer program product includes program code portions for performing any one of the acts of the second and/or the method aspect, when the computer program product is executed on one or more computing devices including a neural network system. Optionally, the computer program product may be stored on a computer-readable medium. The computer program product may also be provided for download, e.g., via a radio or cellular network, the Internet and/or a host computer. Alternatively, or in addition, the method may be encoded in a Field-Programmable Gate Array (FPGA) and/or an Application-Specific Integrated Circuit (ASIC), or the functionality may be provided for download by a hardware description language.

BRIEF DESCRIPTION OF DRAWINGS

Further details of embodiments of the technique are described with reference to the enclosed drawings, wherein:

FIG. 2 shows an example flowchart of a method for retraining at least two operational neural networks by a synthetic retraining data set generated by a synthetic data generator neural network using a neural network system, which neural network system may be implementable by the neural network system of FIG. 1;

FIG. 6 shows an example embodiment of the neural network system of FIG. 1 during the training phase of the synthetic data generator network, wherein the training phase may include (e.g., initial) acts of the method of FIG. 2; and FIG. 7 shows a further example embodiment of the neural network system of FIG. 1 during the retraining phase of two operational neural network systems outputting consistent values of a medical metric, in particular for recognition of myocardial scar tissue, wherein the retraining phase may include (e.g., further) acts of the method of FIG. 2.

DETAILED DESCRIPTION

In the following description, for purposes of explanation and not limitation, specific details are set forth, such as a neural network system including a plurality of neural networks, each neural network including a plurality of hidden layers, in order to provide a thorough understanding of the technique disclosed herein. It will be apparent to one skilled in the art that the technique may be practiced in other embodiments that depart from these specific details.

Figure 1:
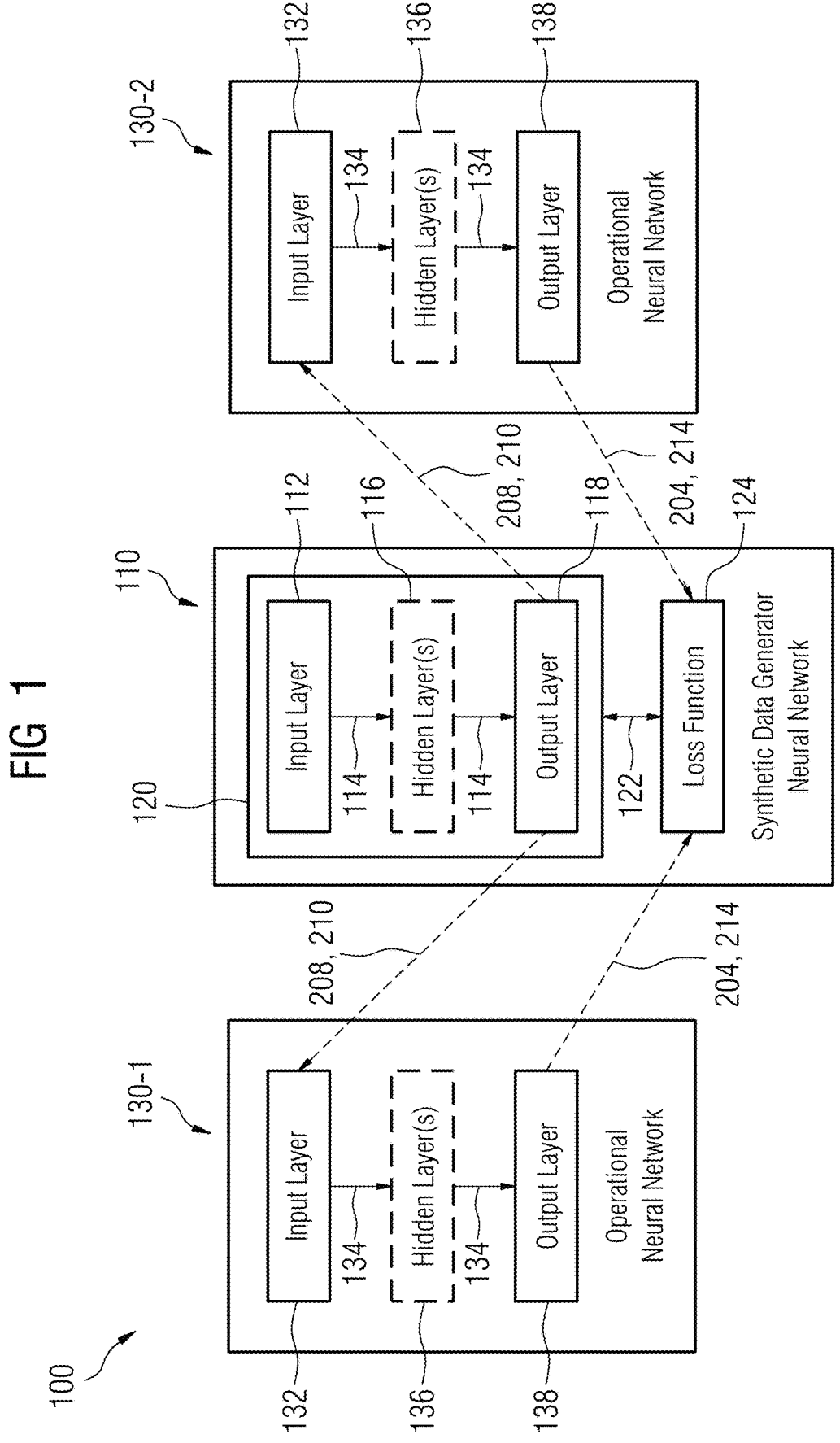
FIG. 1 shows an example schematic block diagram of a neural network system for retraining at least two operational neural networks by a synthetic retraining data set generated by a synthetic data generator neural network.

FIG. 1 schematically illustrates an example block diagram of a neural network system for retraining at least two operational neural networks by a synthetic retraining data set generated by a synthetic data generator neural network. The neural network system is generally referred to by reference sign 100.

The synthetic retraining data set, when used as input to each of the at least two operational neural networks prior to retraining, produces at least one inconsistent output value of a medical metric, and, after retraining, produces, instead of the at least one inconsistent output value, a consistent output value.

The neural network system 100 includes the synthetic data generator neural network 110 and at least two operational neural networks 130-1 and 130-2.

The synthetic data generator neural network 110 includes an input layer 112 configured to receive an input data set. The synthetic data generator neural network further includes an output layer 118 configured to output at reference sign 208, based on the input data set, the synthetic retraining data set for retraining the at least two operational neural networks 130-1, 130-2. The synthetic data generator neural network 110 still further includes a loss function 124 configured to receive at reference sign 204, from each of the at least two operational neural networks 130-1, 130-2 in relation to a loss function evaluation data set, at least one value of the medical metric.

The synthetic data generator neural network 110 includes interconnections 114 between the input layer 112 and the output layer 118. Optionally, the synthetic data generator neural network 110 includes one or more hidden layers 116 with the interconnections 114 passing through the one or more hidden layers 116.

The input layer 112, interconnections 114, output layer 118, and optionally the hidden layers 116, of the synthetic data generator neural network 110 may be included in an auto-encoder-decoder neural network 120. Using an auto-encoder-decoder may also be referred to as deep generative model.

Training the auto-encoder-decoder neural network 120 may include backpropagation.

Each of the at least two operational neural networks 130-1, 130-2 includes an input layer 132 configured to selectively receive, e.g., at reference sign 210, the synthetic retraining data set and the loss function evaluation data set. Each of the at least two operational neural networks 130-1, 130-2 further includes an output layer 138 configured to output, e.g., at reference signs 204, 214, at least one value of the medical metric in relation to each data set received, e.g., at reference sign 210, at the input layer 132.

Each of the at least two operational neural networks 130-1, 130-2 includes interconnections 134 between the input layer 132 and the output layer 138. Optionally, the interconnections 134 pass through one or more hidden layers 136.

Each of the operational neural networks 130-1, 130-2 may include a CNN. Optionally, a layer architecture of each of the at least two operational neural networks 130-1, 130-2 (e.g., each of at least two CNNs) may be identical.

The synthetic data generator neural network 110 with interconnections 114 between the input layer 112 and the output layer 118 of the synthetic data generator neural network 110 is trained for generating the synthetic retraining data set based on the loss function 124 including a function of an absolute value of a difference of the at least one value of the medical metric in relation to the loss function evaluation data set and/or the synthetic retraining data set received, e.g., at reference signs 204, 214, respectively, from each of the at least two operational neural networks 130-1, 130-2.

Each of the at least two operational neural networks 130-1, 130-2 with interconnections 134 between the input layer 132 and the output layer 138 of the respective operational neural network 130-1, 130-2 is retrained by using the synthetic retraining data set generated by the synthetic data generator neural network 110. The synthetic retraining data set may be received at reference sign 210.

FIG. 2 schematically illustrates an example flowchart for a method 200 for retraining, using a neural network system, at least two operational neural networks by a synthetic retraining data set generated by a synthetic data generator neural network. The synthetic retraining data set, when used as input to each of the at least two operational neural networks prior to retraining produces at least one inconsistent output value of a medical metric and after retraining produces instead of the at least one inconsistent output value a consistent output value.

The method 200 includes or initiates an act 202 of receiving, at an input layer of the synthetic data generator neural network, an input data set. The method further includes or initiates an act 204 of receiving, at a loss function of the synthetic data generator neural network from each of the at least two operational neural networks, at least one value of the medical metric in relation to a loss function evaluation data set provided to an input layer of each of the at least two operational neural networks.

The method further includes or initiates an act 206 of training, based on the loss function, the synthetic data generator neural network with interconnections between the input layer and an output layer of the synthetic data generator neural network for generating the synthetic retraining data set based on the input data set. The loss function includes a function of an absolute value of a difference of the at least one value of the medical metric in relation to the loss function evaluation data set received from each of the at least two operational neural networks. The method further includes or initiates an act 208 of outputting, at the output layer of the synthetic data generator neural network, the synthetic retraining data set for retraining the at least two operational neural networks.

The acts 202 to 208 may include a first stage of operation of the neural network system, in which the synthetic data generator neural network is trained. Alternatively, or in addition, the method, in particular the first stage, may further include outputting the loss function evaluation data set at the output layer of the synthetic data generator neural network, e.g., depending on the received input data set. Further alternatively, or in addition, the method, in particular the first stage, may comprise receiving the loss function evaluation data set at the input layer of each of the at least two operational neural networks.

The method further includes or initiates an act 210 of receiving, at the input layer of each of the at least two operational neural networks, the synthetic retraining data set. The method still further includes or initiates an act of retraining 212 each of the at least two operational neural networks with interconnections between the input layer and an output layer of the respective operational neural network using the synthetic retraining data set generated by the synthetic data generator neural network. The method still further includes or initiates an act 214 of outputting, at the output layer of each of the at least two operational neural networks, at least one value of the medical metric in relation to each data set received at the input layer of the respective one of the at least two operational neural networks.

The acts 210 to 214 may include a second stage of operation of the neural network system, in which each of the at least two operational neural networks is retrained and/or finetuned.

Optionally, the method further includes or initiates an act of receiving 216, at the input layer of at least one of the at least two operational neural networks, an operational data set from a medical imaging device. Further optionally, the method includes or initiates an act 218 of outputting, at the output layer of the at least one of the at least two operational neural networks, at least one value of the medical metric in relation to the received operational data set. Generating the output related to the operational data set may be based on the act 212 of retraining, using the synthetic retraining data set generated by the synthetic data generator neural network, the at least one of the at least two operational neural networks.

The acts 216 and 218 may include a third state of operation of the neural network system, in which each operational neural network system independently operates after retraining and/or after finetuning.

The method 200 may be performed by the neural network system 100. For example, the acts 202, 204, 206 and 208 may be performed by the input layer 112, the loss function

124, the layers 112, 116, 118 with interconnections 114 and the output layer 118 of the synthetic data generator neural network 110, respectively. The act 210, and optionally the act 216, may be performed by the input layer 132 of any one of the operational neural networks 130-1, 130-2. The act 212 may be performed by the layers 132, 136, 138 with interconnections 134 of any one of the operational neural networks 130-1, 130-2. The act 214, and optionally the act 218, may be performed by the output layer 138 of any one of the operational neural networks 130-1, 130-2.

By the method 200, a technique is provided for improving a consistency of outputs of one or more values of a medical metric across multiple (i.e., at least two) medical sites without the need for sharing real data sets, e.g., across the medical sites.

Figure 3:
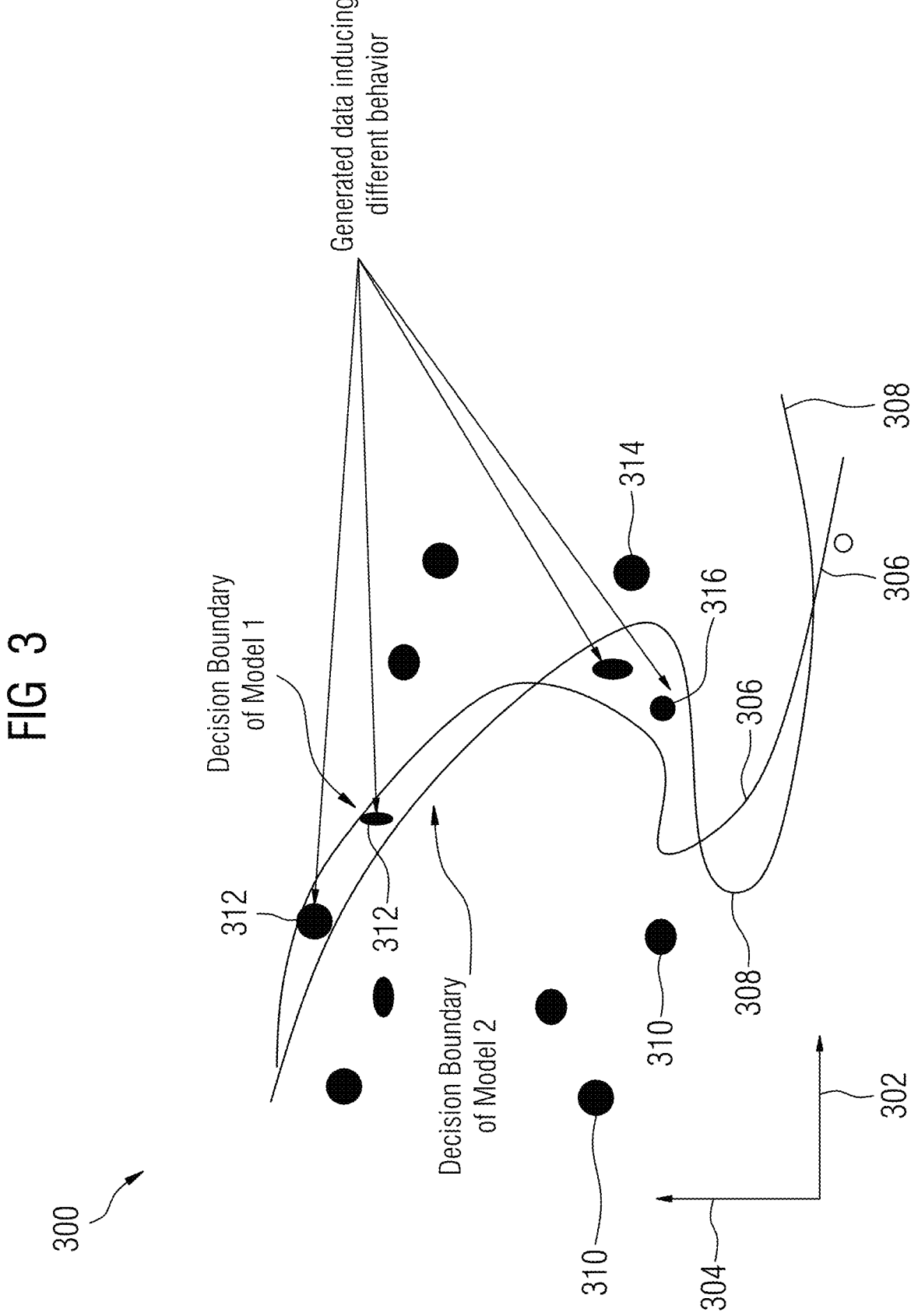
FIG. 3 shows an example of a feature space with a plurality of consistent values of a medical metric away from different decision boundaries of two operational neural networks and one or more inconsistent values of the medical metric close to the different decision boundaries of two operational neural networks, which may correspond to the at least two operational neural networks of the neural network system of FIG. 1.

FIG. 3 shows an example of a feature space 300. The exemplary feature space 300 in FIG. 3 is two-dimensional with horizontal axis 302 and vertical 304. Two different operational neural networks (also denotes as "models"), e.g., the operational networks 130-1, 130-2 of FIG. 1, have been trained independently and/or using different training data sets. Each operational neural network has learned a decision boundary at reference sign 306 for a first operational neural network (also denoted as "model 1") and at reference sign 308 for a second operational neural network (also denoted as "model 2"). The decision boundaries 306 and 308 conventionally differ for independently trained operational neural networks, e.g., the operational neural networks 130-1, 130-2.

Any (e.g., real and/or synthetic) data set input to the input layer 132 of an operational network 130-1; 130-2 may be assigned, e.g., using the interconnections 134 and/or hidden layers 136 of the respective operational neural network 130-1; 130-2, a point in the feature space 300 as shown at reference signs 310, 312, 314 and 316 in FIG. 3.

On one side of the decision boundary 306, the first operational neural network 130-1 may assign one or more first values of a medical metric as exemplified at reference sign 310. E.g., a region on a cardiac MRI may be assigned not to include myocardial scar tissue. On the other side of the decision boundary 306, the first operational neural network 130-1 may assign one or more second values different from the one or more first values of the medical metric as exemplified at reference sign 314. E.g., a region on a cardiac MRI may be assigned to include myocardial scar tissue.

Similarly, on one side of the decision boundary 308, the second operational neural network 130-2 may assign one or more first values of a medical metric as exemplified at reference sign 310, and on the other side of the decision boundary 306, the second operational neural network 130-2 may assign one or more second values different from the one or more first values of the medical metric as exemplified at reference sign 314.

The decision boundaries 306 and 308 may differ in that at reference sign 312, the first operational neural network 130-1 assigns one or more first values of a medical metric, e.g., a region on a cardiac MRI is assigned not to include myocardial scar tissue, whereas the second operational neural network 130-2 assigns one or more second values of the medical metric different from the one or more first values, e.g., the region on the cardiac MRI is assigned to include myocardial scar tissue.

At different points in the feature space 300, the values assigned by the two operational neural networks 130-1, 130-2 may be interchanged and/or inverted. E.g., at reference sign 316 the first operational neural network 130-1 assigns one or more second values of a medical metric, e.g., a region on a cardiac MRI is assigned to include myocardial scar tissue, whereas the second operational neural network 130-2 assigns one or more first values of the medical metric different from the one or more second values, e.g., the region on the cardiac MRI is assigned not to include myocardial scar tissue.

A synthetic retraining data set may be generated, e.g., by the synthetic data generator neural network 110 of FIG. 1, that induces different behavior (e.g., by assigning a second value instead of a first value of a medical metric) in the operational neural networks 130-1, 130-2 (also denoted as "trained models") by optimizing, in particular minimizing, a (e.g., total) loss function. The (e.g., total) loss function may include a sum of multiple terms. Each term may be weighted by a positive (e.g., scalar) number.

The (e.g., total) loss function may include a neuron coverage e.g., a function $f_n(x) = \Sigma_i n_i(x)$, wherein $n_i(x)$ is the output of the i-th neuron as a function of the input image x.

The neuron coverage may include a neuron coverage of any one of the at least two operational neural networks 130-1, 130-2.

A first objective of the method 200 may be to generate one or more synthetic retraining data sets (also denoted as "input data sets for the each of the at least two operational networks") that has or have a maximum neuron coverage, e.g., including a synthetic retraining data set that activates a maximum number of neurons. Conventionally, if some of the neurons have very low output values for the their respective input (e.g., one or more neurons may have a weight close to zero while other neurons have weights close to one or larger than one), it is very likely that the input data sets are not sufficient to test the behavior of an operational neural network, e.g., any one of the at least two operational neural networks 130-1, 130-2, will remain unexplored even after performing a large number of random tests and/or after training by a large training data set. Herein, "large" may refer to a number of training data sets, e.g., several hundred up to several thousand training data sets.

Figure 4:
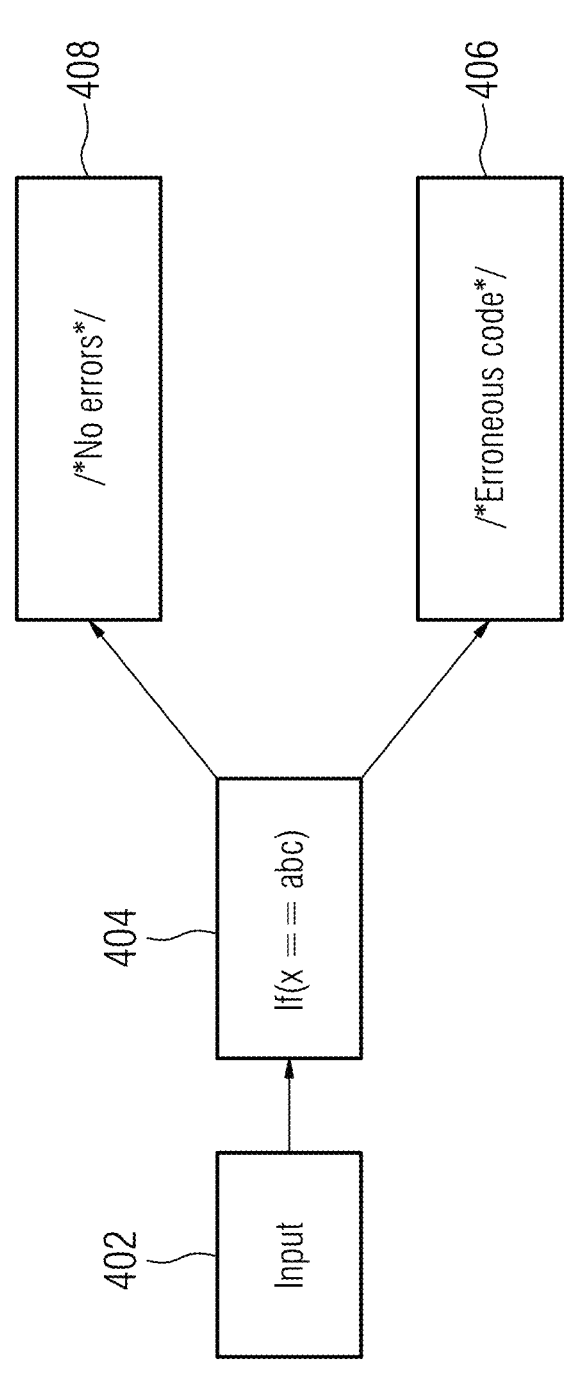
FIG. 4 shows an example of an erroneously trained operational neural network depending on the input data used for the training, wherein the operational neural network may include any one of the operational neural networks of the neural network system of FIG. 1.

FIG. 4 exemplifies the occurrence of an inconsistent (also: "erroneous") behavior of a neural network, e.g., using a simplified analogy of a unit test code coverage of a conventional algorithm (also: "program"). As shown in FIG. 4, if an erroneous code 404 in a conventional algorithm is never covered by any test (e.g., the code 404 was only tested on input data 402 resulting in no errors at reference sign 408), it will result in erroneous behavior at reference sign 406, when the code gets executed on at least part of real data 402, e.g., an operational data set including as input an operational data set (e.g., with rare abnormal and/or pathological features) of any one of the operational neural networks 130-1, 130-2 acquired from a medical imaging device.

Similarly, for a neural network, e.g., any one of the at least two neural networks 130-1, 130-2, conventionally the output of some of the neurons, e.g., of neurons of any one of a plurality of hidden layers 136, may be very low. The neurons with low output will not (or at least not significantly) be involved in the decision making of the output (also denoted as "final results") of the neural network, e.g., at the output layer 138 of any one of the operational neural networks 130-1, 130-2.

By the neural network system 100 and/or the method 200, one or more synthetic retraining data sets are generated to maximize the neuron coverage and ensure consistency of (also denoted as "validate") any output, e.g., by the output layer 138 of any one of the operational neural networks 130-1, 130-2.

The neuron coverage loss ("nc") may be defined as $nc = f_n(x)$ with $f_n(x) = \Sigma_i n_i(x)$ including the sum of the output $n_i(x)$ of all the neurons, wherein $n_i(x)$ is the output of the i-th neuron as a function of the input image x.

Figure 5:
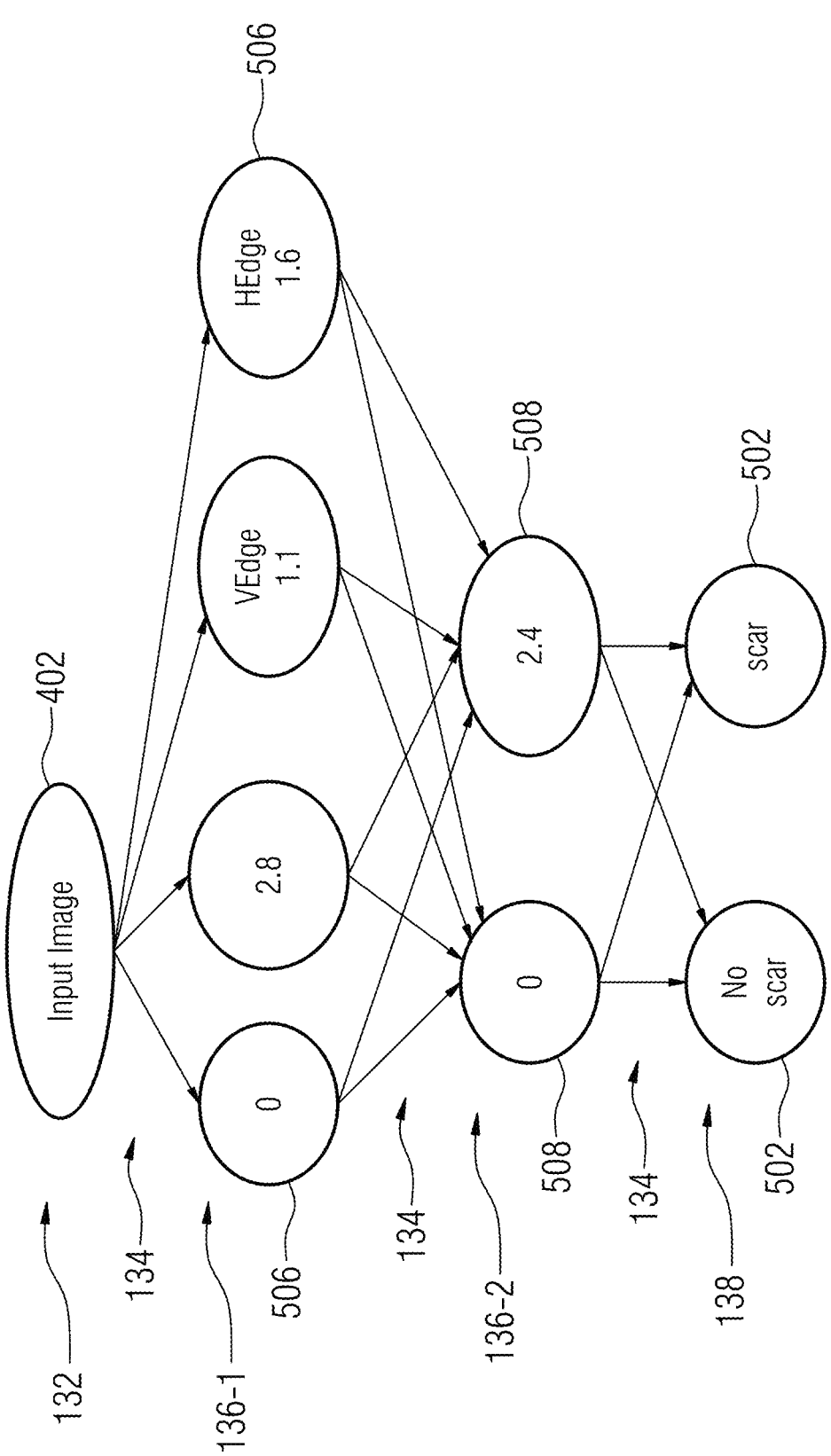
FIG. 5 shows an example of a neural network architecture including a plurality of neurons at a plurality of hidden layers and the output layer, the layers of which may correspond to the layers of any one of the operational neural networks of the neural network system of FIG. 1.

FIG. 5 shows an example of a neuron coverage of a neural network, e.g., any one of the operational neural networks 130-1, 130-2. The example in FIG. 5 shows a neuron of an input layer 132 receiving an input image at reference sign 402, a plurality of neurons 506 and 508 at a first and second hidden layer 136-1, 136-2, respectively, and a plurality of neurons at an output layer 138 providing an output at reference sign 502. The neurons 506, 508 and 502 at the first and second hidden layers 136 and the output layer 138, respectively, in the example of FIG. 5 are interconnected 134 to the neurons 402, 506 and 508 of the preceding input layer 132 and first and second hidden layers 1361, 136-2, respectively.

In the example of FIG. 5, an input image 402 may, e.g., include a cardiac MRI. The activations (also denoted as weights) of the hidden neurons 506, 508 may range from 0 (i.e., no relevance of the output of the corresponding neuron) to a maximum of a positive number (i.e., maximal relevance of the output of the corresponding neuron), e.g., 2.8 in the first hidden layer 136-1 of the example of FIG. 5. The neurons in the first and second hidden layer 136-1, 136-2 may include features (e.g., edges and/or pixel texture) of the input image depending on the layer. For example, at the first hidden layer 136-1, a neuron 506 may include a feature of a vertical edge ("VEdge") or a horizontal edge ("HEdge") in a cardiac MRI images.

At the output layer 138, it may be determined as an example of at least one value of a medical metric, if a region, e.g., of the myocardium, on the input image 402 includes scar tissue or no scar tissue at reference sign 502.

The (e.g., total) loss function may further include a differential behavior of the operational neural networks 130-1, 130-2 (also denoted as "models"). A second objective of the neural network system 100 may include maximizing a difference in the output 502 between the operational neural networks 103-1, 130-2, each of which is trained independently and/or locally, e.g., at a different training site and/or using different training data sets.

The operational neural networks 130-1, 130-2 may be retrained iteratively using a plurality of sequentially generated synthetic retraining data sets. Iteratively retraining may include capturing a difference among the locally trained operational neural networks 130-1 and 130-2 in a function $diff(x) = 1/n \Sigma\Sigma(\varphi_1(i,j) - \varphi_2(i,j))^2$, wherein $\varphi_i$ denotes the output 502 (e.g., an image visualizing the at least one value of the medical metric) of the first operational neural network 130-1 and $\varphi_2$ denotes the output 502 (e.g., an image visualizing the at least one value of the medical metric) of the second operational neural network 130-2. (i,j) may denote a pixel location in the i-th row and j-th column of the input data set x. The difference may be normalized by the total number n of pixels, over which the sums are performed.

The matrices with entries $\varphi_1(i,j)$ and $\varphi_2(i,j)$ for a given input image x may be output 214 from the first and second operational neural network 130-1, 130-2, respectively, to the loss function 124 of the synthetic data generator neural network 110.

Alternatively, or in addition, the model functions $\varphi_1$ and $\varphi_2(y)$ may be reconstructed for any data set y at the synthetic data generator neural network 110, e.g., at the loss function 124, based on weights of neurons provided by each of the at least two operational neural networks 130-1, 130-2.

The (e.g., total) loss function may still further include a reconstruction loss of the synthetic data generator network 110, e.g., an auto-encoder-decoder neural network 120 reconstruction loss.

Figure 6:
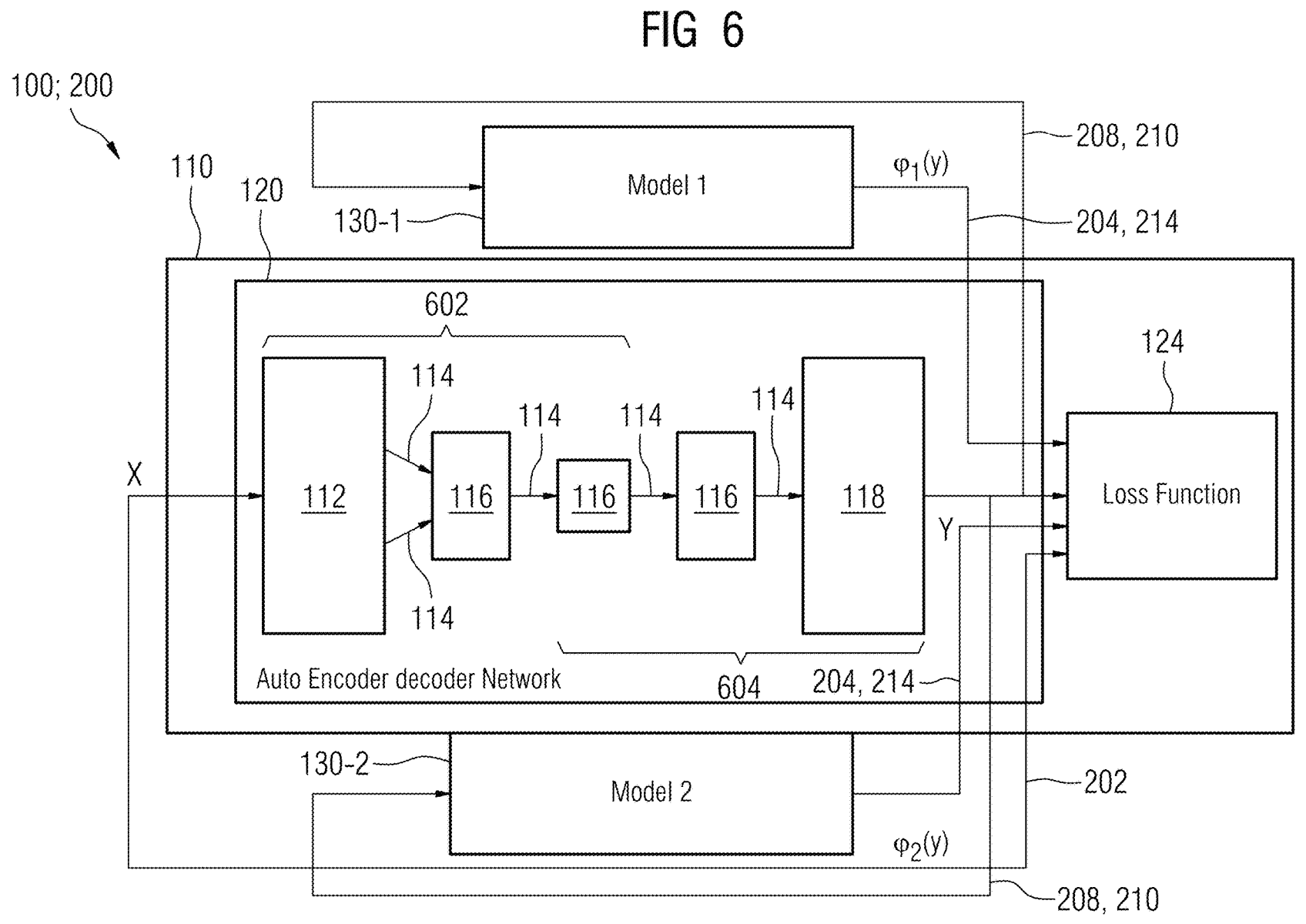

FIG. 6 shows an example of the neural network system 100 including an auto-encoder-decoder neural network 120 in the training phase of the auto-encoder-decoder neural network 120. At reference sign 602, the layers 112, 116 and interconnections 114 of the auto-encoder of the auto-encoder-decoder neural network 120 are schematically depicted. At reference sign 604, the layers 116, 118 and interconnections 114 of the auto-decoder of the auto-encoder-decoder neural network 120 are schematically depicted.

FIG. 6 further includes a data flow according to the method 200. The synthetic data generator neural network 110, e.g., embodied by the auto-encoder-decoder neural network 120 and the loss function 124 in FIG. 6, may be trained to generate synthetic retraining data sets y (not depicted in FIG. 6) for retraining the operational neural networks 130-1, 130-2.

The reconstruction loss of the synthetic data generator neural network 110, e.g., the auto-encoder-decoder neural network 120 of FIG. 6, may be defined as how different the output image y is from the input image x.

The reconstruction loss may be defined as Reconstruction Loss=$(x-f(\theta_i, g(\varphi_i, x_i)))^2$, wherein f and g are decoder and encoder functions, respectively, of the input image x partitioned into $x_i$ with $\varphi_i$ and $\theta_i$ parameters of the encoder and decoder function, respectively.

The total loss function may be a function of the input image x, the output image y and the model functions $\varphi_1(y)$ and $\varphi_2(y)$, $$\text{Total Loss}=(\lambda_1 \text{ Reconstruction Loss}-\lambda_2 nc-\lambda_3 \text{diff}),$$

where $\lambda_1$, $\lambda_2$ and $\lambda_3$ are weights (also: "regularization parameters") that can be adjusted, e.g., manually by an operator of the neural network system. Preferably, $\lambda_1, \lambda_2$ and $\lambda_3$ have values between 0 and 1 such that $\lambda_1+\lambda_2+\lambda_3=1$.

Here, nc and diff are the neuron coverage loss and differential loss. An objective is to minimize the reconstruction loss and maximize neuron coverage and loss due to the different model output. Alternatively, or in addition, the objective is to minimize the total loss.

Figure 7:
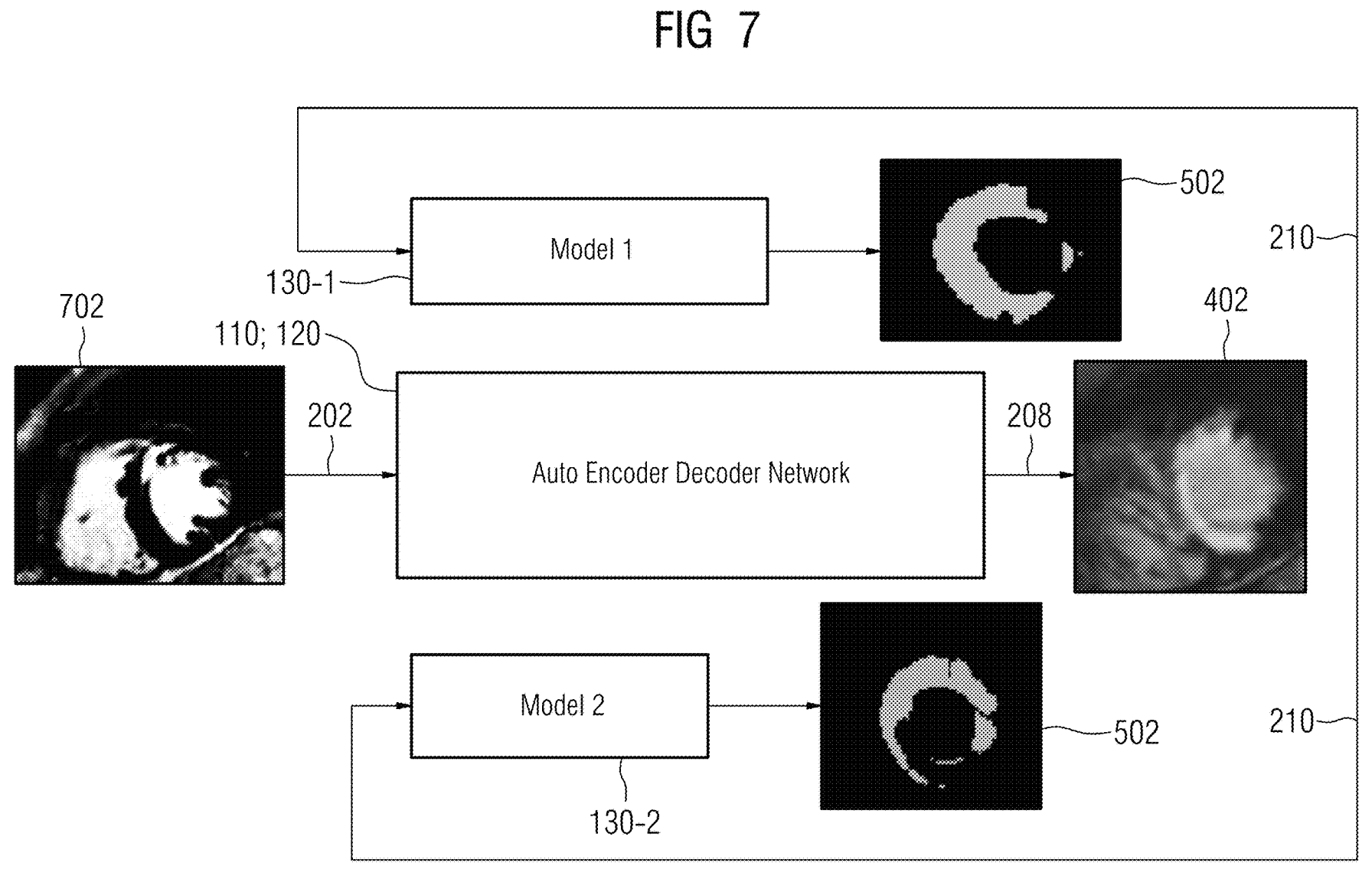

FIG. 7 shows an example of a retraining phase of the at least two operational neural networks 130-1, 130-2 by generating a synthetic retraining data set 402 for myocardial segmentation in LGE cardiac MRI.

In the example of FIG. 7, two operational neural networks 130-1, 130-2 at two different clinical sites are retrained for segmenting LGE cardiac MRI data. The two operational neural networks 130-1, 130-2 include a conventional U-NET (CNN) architecture. Before retraining by one or more synthetic retraining data sets 402, the two operational neural networks 130-1, 130-2 lack robustness due to a limited availability of LGE cardiac MRI data sets for training. Since each of the clinical sites uses different cardiac MRI sequences to generate training data and the training data is conventionally not shared across the sites, it is advantageous to generate, by the neural network system 100 and the method 200, one or more synthetic retraining data sets for retraining both operational neural networks 130-1, 130-2, exploiting the feedback from both operational neural networks 130-1, 130-2, e.g., as detailed in connection with FIG. 6.

As an example of medical imaging, LGE cardiac MRI is widely used to detect the presence of myocardial scar. If the operational neural networks 130-1 and 130-2 are trained to detect myocardium on different data sets at two different sites, an objective of the auto-encoder-decoder neural network 110 is to create one or more synthetic retraining data sets 402, on which the two operational neural network systems 130-1, 130-2 produce at least one inconsistent value related to the presence of scar tissue as the medical metric, e.g., produce a different mask. The one or more synthetic retraining data sets 402 may be annotated to retrain the two operational neural network system 130-1 and 130-2 to produce at least one consistent value related to the presence of scar tissue as the medical metric, e.g., produce an (at least nearly) identical mask.

At reference sign 702 in FIG. 7, an input image x is provided at reference sign 702, from which an output image y as a retraining data set is produced at reference sign 402. The output image y is input to each of the operational neural networks 130-1, 130-2, where is provides inconsistent output values 502 (also denoted as different masks) related to the presence of scar tissue as the medical metric.

The output image y at reference sign 402 may be re-annotated, e.g., manually by a clinical expert, to segment the myocardium. The synthetic image y along with the manual annotation (also denoted as manually generated mask) may be included in a retraining data set used to retrain both operational neural networks 130-1 and 130-2.

One or more synthetic retraining data set may be generated using the synthetic data generator neural network 110 of the neural network system 100 and/or using the method 200, on which the two operational neural networks 130-1 and 130-2 give inconsistent and/or different outputs prior to retraining, and on which the two operational neural networks 130-1 and 130-2 provide consistent and/or (at least nearly) identical outputs after retraining.

By the neural network system, method, non-transitory computer readable storage medium, and computer program product as disclosed herein, retraining of two or more operational neural networks without sharing (e.g., operational) data and/or without sharing parameters (e.g., weights of neurons of identical network architectures) can be improved. By the synthetic data generator neural network generating one or more synthetic retraining data sets for retraining the operational neural networks, a consistency and/or an accuracy of the output of any one of the operational neural networks can be improved on a wide and/or different from conventional distribution of data, in particular for operational data sets including rare and/or abnormal features. Advantageously, a performance and/or efficiency of any one of the at least two operational neural networks within the neural network system may be improved and/or costs and/or a use of resources may be reduced as compared to conventional training techniques.

Many advantages of the present invention will be fully understood from the foregoing description, and it will be apparent that various changes may be made in the form, construction and arrangement of (e.g., the sub-networks of) the neural network system and the associated method without departing from the scope of the invention and/or without sacrificing all of its advantages. Since the invention can be varied in many ways, it will be recognized that the invention should be limited only by the scope of the following claims.

The invention claimed is:

1. A neural network system for retraining at least two operational neural networks by a synthetic retraining data set generated by a synthetic data generator neural network, wherein the synthetic retraining data set, when used as input to each of the at least two operational neural networks prior to retraining produces at least one inconsistent output value of a medical metric and, after retraining, produces, instead of the at least one inconsistent output value, a consistent output value, the neural network system comprising:

a processor;

the synthetic data generator neural network implemented by the processor in communication with a memory, the synthetic data generator neural network comprising:

an input layer configured to receive an input data set;

an output layer configured to output, based on the input data set, the synthetic retraining data set for retraining the at least two operational neural networks; and a loss function configured to receive, from each of the at least two operational neural networks in relation to a loss function evaluation data set, at least one value of the medical metric, wherein the loss function of the synthetic data generator neural network further comprises at least one of a neuron coverage loss, wherein the neuron coverage loss comprises an inducement for training the synthetic data generator neural network to increase a number of neurons covered in the operational neural networks when receiving the synthetic retraining data set; and a reconstruction loss, wherein the reconstruction loss comprises an inducement for training the synthetic data generator neural network to reduce a difference between the input data set of the synthetic data generator neural network and the generated synthetic retraining data set; and the at least two operational neural networks, wherein at least two of the at least two operational neural networks are located at different sites and implemented by respective processors, wherein each of the at least two operational neural networks were previously trained locally at a respective site, each of the at least two operational neural networks comprising:

an input layer configured to selectively receive the synthetic retraining data set and the loss function evaluation data set; and an output layer configured to output at least one value of the medical metric in relation to each data set received at the input layer, wherein the synthetic data generator neural network with first interconnections between the input layer and the output layer of the synthetic data generator neural network is trained for generating the synthetic retraining data set based on the loss function comprising a function of an absolute value of a difference of the at least one value of the medical metric in relation to the loss function evaluation data set received from each of the at least two operational neural networks, and wherein each of the at least two operational neural networks with respective second interconnections between the input layer and the output layer of the respective operational neural network is retrained without sharing operational data and without sharing parameters by using the synthetic retraining data set generated by the synthetic data generator neural network.

2. The neural network system of claim 1, wherein the function of the absolute value of the difference of the at least one value of the medical metric in relation to the loss function evaluation data set received from each of the at least two operational neural networks comprises a negative of a square of the difference of the at least one value of the medical metric.

3. The neural network system of claim 1, wherein the input layer of each of the at least two operational neural networks is further configured to receive an operational data set from a medical imaging device, and wherein the output layer of each of the at least two operational neural networks is further configured to output at least one value of the medical metric in relation to the received operational data set, wherein the output related to the operational data set is based on the first interconnections retrained by the synthetic retraining data set generated by the synthetic data generator neural network.

4. The neural network system of claim 3, wherein the medical imaging device comprises at least one of:

a magnetic resonance imaging, MRI, device;

a computed tomography, CT, device; and an ultrasound imaging device.

5. The neural network system of claim 1, wherein the input data set of the synthetic data generator neural network and the synthetic retraining data set are of a same type.

6. The neural network system of claim 5, wherein the synthetic retraining data set comprises a medical image data set and wherein the input data set of the synthetic data generator neural network comprises at least one of a synthetic medical image set and a medical image set acquired by a medical imaging device.

7. The neural network system of claim 1, wherein the input data set received at the input layer of the synthetic data generator neural network comprises the synthetic retraining data set.

8. The neural network system of claim 1, wherein the synthetic data generator neural network sequentially generates a plurality of synthetic retraining data sets, by recursively generating a further synthetic retraining data set based on a previous synthetic retraining data set.

9. The neural network system of claim 1, wherein the synthetic data generator neural network comprises an autoencoder-decoder neural network.

10. The neural network system of claim 1, wherein the medical metric comprises a cardiac metric.

11. The neural network system of claim 10, wherein the cardiac metric comprises at least one of:

(a) a segmentation, a delineation, and/or spatial position of a region of at least one of a cardiac chamber and myocardium;

(b) a scar burden of the myocardium;

(c) a myocardial elasticity;

(d) a motion pattern;

(e) a linear size of a heart chamber (f) a thickness of a heart wall;

(g) a volumetric size of a heart chamber;

(h) a mass of a heart chamber;

(i) an ejection fraction, EF, of a cardiac chamber; and (j) a hemodynamic index.

12. The neural network system of claim 1, wherein the loss function comprises a sum of:

a negative of a square of the difference of the at least one value of the medical metric in relation to the loss function evaluation data set and/or the synthetic retraining data set received from each of the at least two operational neural networks;

the negative of the neuron coverage loss; and the reconstruction loss, wherein the reconstruction loss comprises an absolute value of a difference between the input data set and a synthetic retraining data set generated, at the synthetic data generator neural network, based on the input data set, wherein the loss function is optimized by minimizing the loss function.

13. The neural network system of claim 1, wherein the synthetic retraining data set comprises a manual annotation as to the at least one value of the medical metric.

14. The neural network system of claim 1, wherein each of the at least two operational neural networks comprises a plurality of hidden layers between the input layer and the output layer of the respective operational neural network.

15. The neural network system of claim 1, wherein the at least two operational neural networks comprise an identical layer architecture, wherein the layer architecture comprises a number of neurons at the input layer, a number of neurons at the output layer, a number of hidden layers, and a number of neurons at each hidden layer.

16. A method of retraining at least two operational neural networks by a synthetic retraining data set generated by a synthetic data generator neural network, wherein the synthetic retraining data set, when used as input to each of the at least two operational neural networks prior to retraining produces at least one inconsistent output value of a medical metric and after retraining produces a consistent output value, the method comprising:

receiving, at an input layer of the synthetic data generator neural network implemented by a processor in communication with a memory, an input data set;

receiving, at a loss function of the synthetic data generator neural network from each of the at least two operational neural networks, at least one value of the medical metric in relation to a loss function evaluation data set provided to an input layer of each of the at least two operational neural networks, wherein at least two of the at least two operational neural networks are located at different sites, wherein each of the at least two operational neural networks were previously trained locally at a respective site, wherein the loss function of the synthetic data generator neural network further comprises at least one of: a neuron coverage loss, wherein the neuron coverage loss comprises an inducement for training the synthetic data generator neural network to increase a number of neurons covered in the operational neural networks when receiving the synthetic retraining data set; and a reconstruction loss, wherein the reconstruction loss comprises an inducement for training the synthetic data generator neural network to reduce a difference between the input data set of the synthetic data generator neural network and the generated synthetic retraining data set;

training, based on the loss function, by the processor, the synthetic data generator neural network with first interconnections between the input layer and an output layer of the synthetic data generator neural network for generating the synthetic retraining data set based on the input data set, wherein the loss function comprises a function of an absolute value of a difference of the at least one value of the medical metric in relation to the loss function evaluation data set received from each of the at least two operational neural networks;

outputting, at the output layer of the synthetic data generator neural network, the synthetic retraining data set for retraining the at least two operational neural networks;

receiving, at the input layer of each of the at least two operational neural networks, the synthetic retraining data set;

retraining, by respective processors, without sharing operational data and without sharing parameters each of the at least two operational neural networks with respective second interconnections between the input layer and an output layer of the respective operational neural network using the synthetic retraining data set generated by the synthetic data generator neural network; and outputting, at the output layer of each of the at least two operational neural networks, at least one value of the medical metric in relation to each data set received at the input layer of the respective one of the at least two operational neural networks.

17. The method of claim 16, further comprising:

receiving, at the input layer of at least one of the at least two operational neural networks, an operational data set from a medical imaging device; and outputting, at the output layer of the at least one of the at least two operational neural networks, at least one value of the medical metric in relation to the received operational data set, wherein generating the output related to the operational data set is based on the retraining, using the synthetic retraining data set generated by the synthetic data generator neural network, the at least one of the at least two operational neural networks.

* * * * *